United States Patent
Richardson et al.

(10) Patent No.: US 10,106,205 B2
(45) Date of Patent: Oct. 23, 2018

(54) REINFORCEMENT STRUCTURE

(71) Applicant: Zephyros, Inc., Romeo, MI (US)

(72) Inventors: Henry E. Richardson, Washington, MI (US); Alexander G. Mangiapane, Macomb Township, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 15/785,872

(22) Filed: Oct. 17, 2017

(65) Prior Publication Data

US 2018/0037272 A1 Feb. 8, 2018

Related U.S. Application Data

(63) Continuation of application No. 15/656,804, filed on Jul. 21, 2017.
(Continued)

(51) Int. Cl.
| | |
|---|---|
| B60J 7/00 | (2006.01) |
| B62D 29/04 | (2006.01) |
| B29C 69/02 | (2006.01) |
| B62D 21/15 | (2006.01) |
| C09J 201/00 | (2006.01) |
| B62D 25/00 | (2006.01) |
| B62D 29/00 | (2006.01) |
| B29K 63/00 | (2006.01) |

(Continued)

(52) U.S. Cl.
CPC ............ *B62D 29/041* (2013.01); *B29C 69/02* (2013.01); *B62D 21/15* (2013.01); *B62D 25/00* (2013.01); *B62D 29/002* (2013.01); *C09J 201/00* (2013.01); *B29K 2063/00* (2013.01); *B29K 2105/0097* (2013.01); *B29K 2105/04* (2013.01); *B29L 2031/30* (2013.01)

(58) Field of Classification Search
CPC ............ C08L 23/0815; C08L 2666/06; A61K 6/0023; Y10S 174/08; B32B 27/08; B29C 66/71; H01L 2924/00014; H01L 2224/48091
USPC ..................................................... 296/187.02
See application file for complete search history.

(56) References Cited

U.S. PATENT DOCUMENTS

| | | |
|---|---|---|
| 3,984,497 A | 10/1976 | Owens et al. |
| 3,985,703 A | 10/1976 | Ferry et al. |

(Continued)

FOREIGN PATENT DOCUMENTS

| | | |
|---|---|---|
| DE | 19812288 C1 | 5/1999 |
| DE | 19856255 A1 | 1/2000 |

(Continued)

OTHER PUBLICATIONS

Potentially Related U.S. Appl. No. 15/656,501, filed Jul. 21, 2017, published as US 2018/0029644 dated Feb. 1, 2018.
(Continued)

*Primary Examiner* — Kiran B Patel
(74) *Attorney, Agent, or Firm* — The Dobrusin Law Firm, PC

(57) ABSTRACT

A structural reinforcement comprising a base reinforcing structure including a plurality of ribs and having a first surface and a second surface, an expandable adhesive material located onto a first portion of the first surface, and a sealant material located around an edge of the second surface, the second surface being substantially free of any of the plurality of ribs.

4 Claims, 3 Drawing Sheets

Related U.S. Application Data

(60) Provisional application No. 62/365,140, filed on Jul. 21, 2016.

(51) Int. Cl.
  *B29K 105/00* (2006.01)
  *B29K 105/04* (2006.01)
  *B29L 31/30* (2006.01)

(56) References Cited

U.S. PATENT DOCUMENTS

| | | | |
|---|---|---|---|
| 4,034,013 A | 7/1977 | Lane | |
| 4,096,202 A | 6/1978 | Farnham et al. | |
| 4,304,709 A | 12/1981 | Salee | |
| 4,306,040 A | 12/1981 | Baer | |
| 4,495,324 A | 1/1985 | Chacko et al. | |
| 4,536,436 A | 8/1985 | Maeoka et al. | |
| 5,102,188 A | 4/1992 | Yamane | |
| 5,275,853 A | 1/1994 | Silvis et al. | |
| 5,464,924 A | 11/1995 | Silvis et al. | |
| 5,575,526 A * | 11/1996 | Wycech | B29C 44/1228 180/68.4 |
| 5,755,486 A | 5/1998 | Wycech | |
| 5,766,719 A | 6/1998 | Rimkus | |
| 5,884,960 A | 3/1999 | Wycech | |
| 5,932,680 A | 8/1999 | Heider | |
| 5,962,093 A | 10/1999 | White et al. | |
| 6,058,673 A * | 5/2000 | Wycech | B29C 44/18 296/187.02 |
| 6,103,784 A | 8/2000 | Hilborn et al. | |
| 6,131,897 A | 10/2000 | Barz et al. | |
| 6,272,809 B1 | 8/2001 | Wycech | |
| 6,348,513 B1 | 2/2002 | Hilborn et al. | |
| 6,368,438 B1 | 4/2002 | Chang et al. | |
| 6,378,933 B1 * | 4/2002 | Schoen | B62D 29/002 296/187.02 |
| 6,467,834 B1 * | 10/2002 | Barz | B62D 25/04 296/187.02 |
| 6,478,367 B2 * | 11/2002 | Ishikawa | B62D 25/04 296/199 |
| 6,607,238 B2 | 8/2003 | Barz | |
| 6,620,501 B1 | 9/2003 | Kassa et al. | |
| 6,793,274 B2 * | 9/2004 | Riley | B62D 21/152 296/187.03 |
| 6,811,864 B2 | 11/2004 | Czaplicki et al. | |
| 6,846,559 B2 | 1/2005 | Czaplicki et al. | |
| 6,883,858 B2 * | 4/2005 | Barz | B62D 29/002 296/187.02 |
| 6,890,021 B2 * | 5/2005 | Bock | B62D 29/002 296/187.02 |
| 6,896,320 B2 | 5/2005 | Kropfeld | |
| 6,920,693 B2 | 7/2005 | Hankins et al. | |
| 6,921,130 B2 * | 7/2005 | Barz | B62D 25/04 296/187.03 |
| 6,932,421 B2 | 8/2005 | Barz | |
| 6,935,681 B2 | 8/2005 | Hasler et al. | |
| 6,941,719 B2 | 9/2005 | Busseuil et al. | |
| 6,953,219 B2 | 10/2005 | Lutz et al. | |
| 7,004,536 B2 | 2/2006 | Wieber | |
| 7,043,815 B2 | 5/2006 | Lande et al. | |
| 7,077,460 B2 * | 7/2006 | Czaplicki | B29C 44/18 296/187.02 |
| 7,111,899 B2 | 9/2006 | Gray | |
| 7,125,461 B2 * | 10/2006 | Czaplicki | B62D 29/002 156/79 |
| 7,199,165 B2 | 4/2007 | Kassa et al. | |
| 7,249,415 B2 | 7/2007 | Larsen et al. | |
| 7,313,865 B2 | 1/2008 | Czaplicki et al. | |
| 7,374,219 B2 * | 5/2008 | Brennecke | B62D 29/002 296/187.02 |
| 7,478,478 B2 | 1/2009 | Lutz et al. | |
| 7,503,620 B2 | 3/2009 | Brennecke et al. | |
| 7,641,264 B2 * | 1/2010 | Niezur | B62D 25/00 296/187.02 |
| 7,673,930 B2 | 3/2010 | Stratman | |
| 7,748,773 B2 * | 7/2010 | Niezur | B32B 3/12 296/187.02 |
| 7,926,867 B2 * | 4/2011 | Kochert | B62D 29/002 296/187.02 |
| 8,002,332 B2 | 8/2011 | Coon et al. | |
| 8,020,924 B2 | 9/2011 | Niezur et al. | |
| 8,047,603 B2 * | 11/2011 | Goral | B29C 45/14778 296/187.03 |
| 8,361,589 B2 | 1/2013 | Kraushaar | |
| 8,366,181 B2 | 2/2013 | Belpaire | |
| 8,388,037 B2 | 3/2013 | LaNore et al. | |
| 9,034,135 B2 | 5/2015 | Schulenburg et al. | |
| 9,096,005 B2 * | 8/2015 | Kanie | B29C 44/18 |
| 9,592,858 B2 | 3/2017 | Kraushaar | |
| 9,782,950 B2 * | 10/2017 | Richardson | B32B 7/02 |
| 9,895,712 B2 | 2/2018 | Buck | |
| 2001/0042353 A1 | 11/2001 | Honda | B29C 44/1228 296/146.6 |
| 2002/0125739 A1 * | 9/2002 | Czaplicki | B62D 29/002 296/187.02 |
| 2003/0137162 A1 * | 7/2003 | Kropfeld | B62D 29/002 296/203.01 |
| 2004/0076831 A1 | 4/2004 | Hable et al. | |
| 2004/0130185 A1 * | 7/2004 | Hasler | B62D 29/002 296/193.06 |
| 2004/0204551 A1 | 10/2004 | Czaplicki | |
| 2004/0256888 A1 * | 12/2004 | Le Gall | B62D 29/002 296/187.02 |
| 2004/0262853 A1 | 12/2004 | Larsen et al. | |
| 2005/0035628 A1 * | 2/2005 | Behr | B22D 19/02 296/187.02 |
| 2005/0159531 A1 | 7/2005 | Ferng | |
| 2005/0212332 A1 | 9/2005 | Sheldon et al. | |
| 2005/0230027 A1 * | 10/2005 | Kassa | C08G 18/10 156/79 |
| 2005/0268454 A1 | 12/2005 | White | |
| 2005/0269840 A1 | 12/2005 | Finerman et al. | |
| 2006/0008615 A1 * | 1/2006 | Muteau | B29C 44/385 428/116 |
| 2006/0181089 A1 * | 8/2006 | Andre | B29C 70/76 293/120 |
| 2007/0018483 A1 * | 1/2007 | Kerscher | B62D 29/002 296/187.02 |
| 2007/0080559 A1 * | 4/2007 | Stolarski | B60J 5/0404 296/146.6 |
| 2007/0090666 A1 * | 4/2007 | Brennecke | B60J 5/0451 296/146.6 |
| 2007/0095475 A1 | 5/2007 | Hable et al. | |
| 2007/0096508 A1 * | 5/2007 | Rocheblave | B62D 21/152 296/193.07 |
| 2008/0029200 A1 * | 2/2008 | Sheasley | B60R 13/06 156/79 |
| 2009/0085379 A1 * | 4/2009 | Takahashi | B62D 25/04 296/193.06 |
| 2010/0015427 A1 | 1/2010 | Belpaire et al. | |
| 2010/0092733 A1 | 4/2010 | Blank et al. | |
| 2010/0117397 A1 * | 5/2010 | Richardson | B62D 29/002 296/187.02 |
| 2010/0253004 A1 | 10/2010 | Lehmann et al. | |
| 2011/0049323 A1 | 3/2011 | Belpaire et al. | |
| 2011/0104413 A1 * | 5/2011 | Mendibourne | B62D 29/002 428/35.7 |
| 2011/0189428 A1 | 8/2011 | Belpaire et al. | |
| 2011/0206890 A1 * | 8/2011 | Belpaire | B62D 29/002 428/68 |
| 2011/0236610 A1 | 9/2011 | Belpaire | |
| 2011/0236616 A1 | 9/2011 | Belpaire | |
| 2012/0141724 A1 | 6/2012 | Belpaire et al. | |
| 2012/0207986 A1 | 8/2012 | Belpaire et al. | |
| 2013/0133771 A1 * | 5/2013 | Richardson | F16L 9/00 138/109 |
| 2013/0181470 A1 | 7/2013 | LaNore et al. | |
| 2013/0220418 A1 | 8/2013 | Heidtman et al. | |
| 2014/0091584 A1 * | 4/2014 | McConnell | B60R 19/18 293/120 |
| 2015/0016737 A1 | 1/2015 | Yie et al. | |

(56) References Cited

U.S. PATENT DOCUMENTS

| | | | |
|---|---|---|---|
| 2015/0165737 A1* | 6/2015 | Richardson | B32B 27/38 428/172 |
| 2016/0273160 A1* | 9/2016 | Braymand | B29C 44/188 |
| 2017/0072887 A1* | 3/2017 | Richardson | B62D 29/002 |
| 2018/0029328 A1* | 2/2018 | Richardson | B29C 65/4855 |
| 2018/0029644 A1 | 2/2018 | Li et al. | |
| 2018/0037264 A1 | 2/2018 | Li et al. | |
| 2018/0037703 A1* | 2/2018 | Richardson | C08J 5/04 |

FOREIGN PATENT DOCUMENTS

| | | |
|---|---|---|
| DE | 19838955 A1 | 3/2000 |
| DE | 19858903 A1 | 6/2000 |
| EP | 1122153 A3 | 10/2003 |
| EP | 1391250 A2 | 2/2004 |
| EP | 1759959 A2 | 3/2007 |
| EP | 1759964 A1 | 3/2007 |
| EP | 1932648 A1 | 6/2008 |
| EP | 1373053 B1 | 12/2008 |
| EP | 2019027 A1 | 1/2009 |
| EP | 2117909 A1 | 11/2009 |
| EP | 2121270 A1 | 11/2009 |
| EP | 2147848 A1 | 1/2010 |
| EP | 2154052 A1 | 2/2010 |
| EP | 2159109 A1 | 3/2010 |
| EP | 2159136 A1 | 3/2010 |
| EP | 2165919 A1 | 3/2010 |
| EP | 2183150 A1 | 5/2010 |
| EP | 2238012 A1 | 10/2010 |
| EP | 2323891 A1 | 5/2011 |
| EP | 2331368 A2 | 6/2011 |
| EP | 2334540 A1 | 6/2011 |
| EP | 2337728 B1 | 6/2011 |
| EP | 2463180 A1 | 6/2012 |
| EP | 2234803 B1 | 10/2012 |
| EP | 2289769 B1 | 11/2012 |
| EP | 2289771 B1 | 1/2013 |
| EP | 2553036 A1 | 2/2013 |
| EP | 2401191 B1 | 4/2013 |
| FR | 2749263 | 5/1996 |
| GB | 2421478 A | 6/2006 |
| JP | 07-031569 A | 2/1995 |
| JP | 07-117728 A | 5/1995 |
| JP | 2002-362412 A | 12/2002 |
| JP | 2003-063443 A | 3/2003 |
| WO | 2000/037302 | 6/2000 |
| WO | 2002/074609 A1 | 9/2002 |
| WO | 2005/105405 A1 | 11/2005 |
| WO | 2009/080814 A1 | 7/2009 |
| WO | 2010/018190 A1 | 2/2010 |

OTHER PUBLICATIONS

Potentially Related U.S. Appl. No. 15/785,878, filed Oct. 17, 2017, published as US 2018/0037264 dated Feb. 8, 2018.

International Search Report and Written Opinion for Application No. PCT/US2017/043332 dated Nov. 2, 2017.

International Search Report and Written Opinion for Application No. PCT/US2017/043252 dated Nov. 10, 2017.

\* cited by examiner

REINFORCEMENT STRUCTURE

FIELD OF THE INVENTION

The present invention relates generally to reinforcement of structures, and more particularly to reinforcement of vehicle structures using structural reinforcements with associated adhesives and sealants.

BACKGROUND OF THE INVENTION

In various locations throughout transportation vehicles, recent years have seen the increased use of structural reinforcements in which vehicle cavities are commonly fitted with structural reinforcements that aid in controlling deformation from an impact. For some applications, it has become popular in recent years to employ a carrier structure in combination with a secondary material, such as an expandable adhesive material as part of the reinforcement. See e.g., U.S. Pat. Nos. 6,932,421; 6,921,130; 6,920,693; 6,890,021; and 6,467,834 all incorporated by reference. Often, these structures are manufactured using injection molding and/or co-extrusion processes.

However, the remains a need for structural reinforcements that include multiple differing secondary materials and/or attachments while still maintaining minimal cycle time during manufacturing.

SUMMARY OF THE INVENTION

The present teachings meet one or more of the above needs by the improved devices and methods described herein.

In one aspect, the present teachings pertain to a structural reinforcement comprising a base reinforcing structure including a plurality of ribs and having a first surface and a second surface, an expandable adhesive material located onto a first portion of the first surface, and a sealant material located around an edge of the second surface, the second surface being substantially free of any of the plurality of ribs.

The expandable adhesive material and sealant material may be free of any direct contact with one another in the green state. The expandable adhesive material and sealant material may be free of any direct contact with one another post-activation. The expandable adhesive material and sealant material may make direct contact with one another during activation. The second surface may include a substantially flat portion. The first surface may be substantially free of any sealant material. The second surface may be substantially free of any structural adhesive material. The first surface may be arranged such that it is in a plane that lies substantially perpendicular to the plane of the second surface. The sealant material may be located along an edge of the second surface that is arranged adjacent to the first surface. The structural adhesive material have a higher expansion rate during activation than the sealant material. The sealant material have a higher expansion rate during activation than the structural adhesive material.

The teachings herein further provide for a method comprising locating a polymeric material in a mold to form a base reinforcing structure including a first surface and a second surface, molding an expandable adhesive material onto the base reinforcing structure, removing the base reinforcing structure and adhesive material from the mold, and extruding a sealant material onto an edge of the base reinforcing structure, wherein the sealant material is located onto the second surface of the base reinforcing structure that is substantially free of any adhesive material.

The sealant material may be extruded via a mini-applicator. The expandable adhesive material and sealant material may be applied so that they are substantially free of any direct contact with one another in the green state. The expandable adhesive material and sealant material may be applied so that they are free of any direct contact with one another post-activation. The expandable adhesive material and sealant material may be applied so that they make direct contact with one another during activation. The second surface may be molded to include a substantially flat portion. No sealant material may be applied to the first surface. No structural adhesive material may be molded onto the second surface. The first surface may be molded such that it is in a plane that lies substantially perpendicular to the plane of the second surface. The sealant material may be extruded along an edge of the second surface that is arranged adjacent to the first surface.

DETAILED DESCRIPTION

Figure 1:
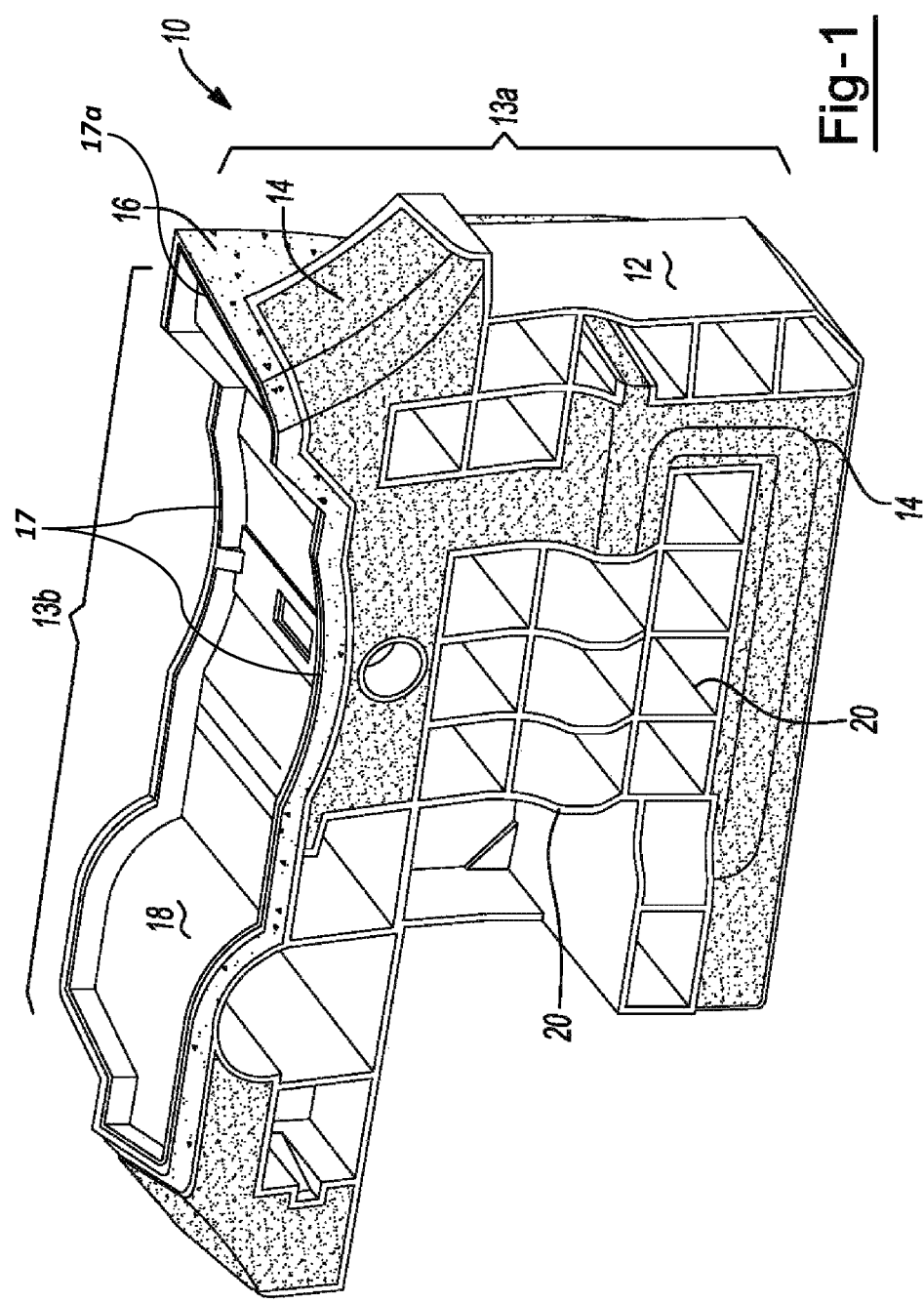
FIG. 1 is a perspective view of an illustrative reinforcement in accordance with the present teachings.

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the priority date U.S. Provisional Application Ser. No. 62/365,140, filed Jul. 21, 2016, the contents of that application being hereby incorporated by reference herein for all purposes.

The invention herein contemplates a unique approach for providing a structural reinforcement that carries at least two different secondary materials.

The base reinforcing structure may be formed of a moldable material, which may be a polymeric material, which may be a nylon material. The base reinforcing material may be formed by pultrusion. The polymeric material may be a reinforced polymeric material. For example, the polymeric material may be a glass fiber reinforced nylon. The polymeric material may be a polyurethane. The polymeric material may be a thermoset material. The polymeric material may be a thermoplastic material. The polymeric material may be a thermoplastic epoxy material. The polymeric material may be a fiber reinforced thermoplastic epoxy material.

The adhesive material and/or sealant material may be a material that experiences expansion and/or cure upon exposures to temperatures of between about 148.89° C. to about 204.44° C. (about 300° F. to about 400° F.) (i.e., temperatures typically experienced in automotive painting or coating operations). The adhesive material and/or material may be foamed to a volume of at least 5% greater, at least 50% greater, at least 200% greater, at least 1000% greater, at least 2000% greater, at least 5000% greater or higher relative to the original unexpanded volume.

The adhesive and/or sealant material may be an epoxy based material such as those disclosed in U.S. Pat. Nos. 5,884,960; 6,348,513; 6,368,438; 6,811,864; 7,125,461; 7,249,415; and U.S. Patent Publication No. 2004/0076831, hereby incorporated by reference.

The adhesive materials and sealant materials may include an epoxy resin component. Epoxy resin is used herein to mean any of the conventional epoxy materials containing at least one epoxy functional group. The epoxy resins can be difunctional, trifunctional, multifunctional, combinations thereof or otherwise. Moreover, the term epoxy resin can be used to denote one epoxy resin or a combination of epoxy resins. The polymer-based materials may be epoxy-containing materials having one or more oxirane rings polymerizable by a ring opening reaction. In preferred embodiments, the adhesive and/or sealant material of this invention includes between about 2% and 70% by weight epoxy resin, more preferably between about 7% and 50% by weight epoxy resin and even more preferably between about 15% and 40% by weight epoxy resin and even possibly between about 15% and about 25% by weight epoxy resin.

The epoxy may be aliphatic, cycloaliphatic, or aromatic. The epoxy may be supplied as a solid (e.g., as pellets, chunks, pieces or the like) or a liquid (e.g., an epoxy resin) or both. As used herein, a resin is considered to be a solid resin if it is solid at a temperature of 23° C. and is considered to be a liquid resin if it a liquid at 23° C. The presence of the epoxy resin increases the adhesion, flow properties, or both of the adhesive and/or sealant. One exemplary epoxy resin may be a phenolic resin, which may be a novalac type or other type resin. For example, bisphenol A resin, bisphenol F resin, a combination thereof or the like may be employed. Moreover, various mixtures of several different epoxy resins may be employed. Examples of suitable epoxy resins are sold under the tradename DER® (e.g., DER 331, DER 661, DER 662), commercially available from the Dow Chemical Company, Midland, Mich.

Liquid epoxy resins may be utilized. Such resins may be utilized to reduce the overall viscosity of the adhesive or sealant. Liquid epoxy resins that may be used typically have a viscosity at a temperature of 23° C. of at least 5000, more typically at least 8000 and even possibly at least 11,000 cps, but typically less than 30,000, more typically less than 22,000 and even possibly less than 15,000 cps, although higher and lower values may also be possible unless otherwise stated. The liquid epoxy resin typically has an epoxy equivalent weight of at least 80, more typically at least 150 and even possibly at least 185 g/eq, but typically less than 300, more typically less than 220 and even possibly less than 195 g/eq, although higher and lower values may also be possible unless otherwise stated. Preferred liquid resins include diglycidyl ethers that may be aromatic phenol based (bisphenol A or F) and are sold under the tradename DER 331, commercially available from the Dow Chemical Company and EPON 828 and EPON 863, commercially available from Hexion Specialty Chemicals.

In the preferred embodiment the epoxy resins used are such that the formulated adhesive and sealant are dry to the touch at ambient temperature.

Additional polymeric materials may be utilized. As one example, one or more thermoplastic modifiers such as polyethers which include pendant hydroxyl moieties. Particularly desirable thermoplastic polyethers are phenoxy resins. As used herein, phenoxy resin is a polyhydroxyether, with ether linkages along the polymer backbone and pendant hydroxyl groups. One useful phenoxy resin is the reaction product of a phenol based difunctional epoxy resin and a difunctional phenol (for example the reaction product of bisphenol A epoxy with bisphenol A). A similar material may also be synthesized directly from a bisphenol (for example bisphenol A) and epichlorohydrin. The terminal epoxy group may be ring opened to generate a terminal alpha glycol group. The phenoxy resins have weight-average molecular weights of at least about 5,000, more typically at least about 25,000 and still more typically at least about 50,000 but less than about 100,000, more typically less than about 75,000 and still more typically less than about 60,000. Other thermoplastic polyethers include aromatic ether/amine repeating units in their backbones such as polyether-amines, poly(amino ethers), copolymers of monoethanolamine and diglycidyl ether, combinations thereof or the like. Examples of thermoplastic polyethers are disclosed in U.S. Pat. Nos. 5,275,853; 5,464,924 and 5,962,093. The thermoplastic modifiers such as the polyethers preferably comprise between 3% and about 40% by weight of the adhesive or sealant material and even more preferably between about 10% and 30% more preferably between 10% and about 15%.

Several additional polymers may be incorporated into the adhesive and/or sealant material, e.g., by copolymerization, by blending, or otherwise. For example, without limitation, other polymers that might be appropriately incorporated into the sealant material include halogenated polymers, polycarbonates, polyketones, urethanes, polyesters, silanes, sulfones, allyls, olefins, styrenes, acetates, ethylene vinyl acetates, acrylates, methacrylates, epoxies, silicones, phenolics, rubbers, polyphenylene oxides, terphthalates, or mixtures thereof. Other potential polymeric materials may be or may include, without limitation, polyethylene, polypropylene, polystyrene, polyolefin, polyacrylate, poly(ethylene oxide), poly(ethyleneimine), polyester, polyurethane, polysiloxane, polyether, polyphosphazine, polyimide, polyimide, polyisobutylene, polyacrylonitrile, poly(vinyl chloride), poly(methylmethacrylate), poly(vinyl acetate), poly(vinylidene chloride), polytetrafluoroethylene, polyisoprene, polyacrylamide, polyacrylic acid, polymethacrylate, and polyacetals.

It is possible that the adhesive and/or sealant material includes an acrylate copolymer, acetate copolymer or both. The adhesive and/or sealant material may include ethylene methyl acrylate (EMA), ethylene vinyl acetate (EVA) or a combination thereof. When included, EMA is typically between about 1% and about 70%, more typically between about 30% and about 60% and even more typically between about 44% and about 55% by weight of the adhesive and/or sealant material. A desirable EMA can have a melt index between about 110 and about 150 grams/10 min. (e.g., about 135 grams/10 min.). One preferred EMA is sold under the tradename TC140 and is commercially available from Exxon. When included, EVA is typically between about 1% and about 70%, more typically between about 2% and about 10% and even more typically between about 3% and about 5% by weight of the melt flow material.

It is also contemplated that the adhesive and/or sealant material can include one or more isocyanate reactive ingredients (e.g., polyols), which can be reactive with blocked isocyanates. Example of such ingredients and isocyanates are disclosed in U.S. Patent Application, Publication No. 2005/0320027, which is incorporated herein by reference for all purposes.

The adhesive and/or sealant material may include one or more additional polymers (e.g., copolymers), which are typically, but not necessarily copolymers or terpolymers, which can include a variety of different polymers, such as thermoplastics, elastomers, thermosets, thermosettables combinations thereof or the like. For example, and without limitation, polymers that might be appropriately incorporated into the adhesive and/or sealant material include halogenated polymers, polycarbonates, polyketones, and polymers of urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, polyethylene oxide), poly (ethyleneimine), polyester, polyurethane, polysiloxane, polyether, polyphosphazine, polyimide, polyimide, polyisobutylene, polyacrylonitrile, polyvinyl chloride), poly(methyl methacrylate), polyvinyl acetate), poly(vinylidene chloride), polytetrafluoroethylene, polyisoprene, polyacrylamide, polyacrylic acid, polymethacrylate. Although not required, it may be desired for the adhesive and/or sealant material to include one or more ethylene polymers or copolymers such as ethylene acrylates, ethylene acetates, or the like. Ethylene methacrylate and ethylene vinyl acetate are two preferred ethylene copolymers. When used, the one or more additional polymers comprises about 0.1% to about 50%, more preferably about 1% to about 20% and even more preferably about 5% to about 15% by weight of the adhesive and/or sealant material.

The adhesive and/or sealant material can also include one or more materials for controlling the rheological characteristics of the sealant material over a range of temperatures (e.g., up to about 250° C. or greater). Any suitable art-disclosed rheology modifier may be used, and thus the rheology modifier may be organic or inorganic, liquid or solid, or otherwise. The rheology modifier may be a polymer, and more preferably one based upon an olefinic (e.g., an ethylene, a butylenes, a propylene or the like), a styrenic (e.g., a styrene-butadiene-containing rubber), an acrylic or an unsaturated carboxylic acid or its ester (such as acrylates, methacrylates or mixtures thereof; e.g., ethylene methyl acrylate (EMA) polymer) or acetates (e.g., EVA). The rheology modifier may be provided in a generally homogeneous state or suitable compounded with other ingredients. It is also contemplated that the various clays, minerals or other materials discussed in relation to fillers below can be employed to modify rheology of the adhesive and/or sealant material.

The adhesive and/or sealant material may each include one or more curing agents that assist the adhesive and/or sealant material in curing by crosslinking of the polymers, epoxy resins and other ingredients in the material. The amount of curing agents or curing agent accelerators present in the adhesive and/or sealant material range from about 0.001% by weight to about 9% by weight and more typically from about 0.2 to about 6 wt %, and even more typically from about 2 wt % to about 6% by weight. The curing agent materials can be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), dihydrazides, sulfonamides, diamino diphenyl solfone, anhydrides, mercaptans, imidazoles, ureas, tertiary amines, BF3 complexes or mixtures thereof. Particular preferred curing agents include modified and unmodified polyamines or polyamides such as triethylenetetramine, diethylenetriamine tetraethylenepentamine, cyanoguanidine, dicyandiamides and the like.

An accelerator for the curing agents (e.g., a modified or unmodified urea such as methylene diphenyl bis urea, an imidazole, blocked amine or a combination thereof) may also be provided for preparing the adhesive and/or sealant material.

The adhesive and/or sealant materials may contain other additives such as flexibilizers, impact modifiers, polymers or copolymers fillers and other elongation promoting additives.

If included, such impact modifiers (e.g., toughening agents) contribute to the desired mechanical properties of the adhesive and/or sealant material such as Lap Shear and T Peel strength by the distribution of energy within the adhesive and/or sealant system. It is generally preferable for the impact modifier to be at least 4%, more typically at 10%, and even more typically at least 20% by weight of the adhesive and/or sealant material and also preferable for the impact modifier to be less than 70%, more typically less than 40% an even more typically less than 30% by weight of the adhesive and/or sealant material. The term "impact modifier" can include one impact modifier or several impact modifiers. The impact modifier can include thermoplastics, thermosets or thermosettables, elastomers, combinations thereof or the like. In a preferred embodiment the impact modifier includes elastomer (including elastomer containing materials), a core/shell polymer (which may include elastomer), or a combination thereof.

The impact modifier may include a substantial portion of core/shell impact modifier. When it includes a core/shell polymer it is preferred that the impact modifier is comprised of at least 60%, more typically at least 80% and even possibly at least 97% core/shell polymer. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or the same core/shell systems.

The first and second polymeric materials of the core/shell impact modifier can include elastomers, polymers, thermoplastics, copolymers, other components, combinations thereof or the like. In preferred embodiments, the first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, poly-styrenics, poly-acrylonitriles, poly-acrylates, poly-acetates, polyamides, and poly-olefins.

Preferred core/shell impact modifiers are formed by emulsion polymerization followed by coagulation or spray drying. In certain applications, coagulated grades of core/shell impact modifiers have been found particularly desirable for promoting adhesion to surfaces having impurities thereon such as dirt, oil (e.g., metal stamping oil) or the like. Such impact modifiers can reduce the likelihood of adhesive failure (as opposed to cohesive failure).

Examples of useful core-shell graft copolymers that may be used as impact-modifiers are those where hard containing compounds, such as styrene, acrylonitrile or methyl methacrylate, are grafted onto a core made from polymers of soft or elastomeric containing compounds such as butadiene or butyl acrylate. U.S. Pat. No. 3,985,703, describes useful core-shell polymers, the core polymers of which are made from butyl acrylate but can be based on ethyl isobutyl, 2-ethylhexyl or other alkyl acrylates or mixtures thereof. The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl methacrylate and optionally other alkyl methacrylates, such as ethyl and butyl methacrylates or mixtures thereof. Up to 40 percent by weight or more of the shell monomers may be styrene, vinyl acetate, vinyl chloride, and the like. Additional core-shell graft copolymers useful in embodiments of the present invention are described in U.S. Pat. Nos. 3,984, 497; 4,096,202; 4,034,013; 3,944,631; 4,306,040; 4,495, 324; 4,304,709; and 4,536,436. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

The adhesive and/or sealant composition may be activatable (e.g., foamable) and as such it may contain one or more foaming agents that typically produce inert gasses that transform the adhesive/sealant into an open and/or closed cellular structure. The expansion can help to improve adhesion, sealing capability, acoustic damping, reduce density, or a combination of factors. Amounts of blowing agents and blowing agent accelerators that can be used can vary widely depending upon the type of cellular structure desired, the desired amount of expansion of the adhesive and/or sealant material, the melt viscosity of the materials, and the desired rate of expansion. Exemplary ranges for the amounts of blowing agents and blowing agent accelerators in the activatable material range from about 0.001% by weight to 2%.

Chemical blowing agents that may be used include one or more nitrogen containing groups such as amides, amines, and the like. Examples of suitable blowing agents include dinitrosopentamethylenetetramine, azodicarbonamide, dinitrosopentamethylenetetramine, 4,4'oxy-bis-(benzene-sulphonylhydrazide), trihydra-zinotriazine and N, N'-dimethyl-N, N'-dinitroso-terephthalamide.

Physical blowing agents may additionally or alternatively be employed. As one example, solvent filled polymeric shells that soften and expand upon exposure to heat may be used. A typical example is sold under the trade name Expancel by Akzo Nobel.

An accelerator for the chemical blowing agents may also be provided in the adhesive and/or sealant material to increase the rate at which the blowing agents form inert gasses. One preferred blowing agent accelerator is a metal salt, such as an oxide, for example zinc oxide. Other preferred accelerators include organic bases such as urea and organic acids such as adipic or benzoic acid. Zinc benzene sulfonate may also be a desirable accelerator.

The adhesive and/or sealant material of the present invention may also include one or more fillers, including but not limited to particulate materials (e.g., powder), beads, microspheres, or the like. Use of fillers can impart properties such as strength, dimensional stability, and impact resistance to the adhesive and/or sealant they can however reduce elongation properties. Filler addition can also reduce formulation cost and produce products that have less tack prior to cure.

Examples of fillers that may be used include silica, diatomaceous earth, glass, clay (e.g., including nanoclay), talc, pigments, colorants, glass beads or bubbles, carbon or ceramic fibres and nylon or polyamide fibres (e.g., Kevlar). Examples of suitable fillers include, without limitation, wollastonite, talc, vermiculite, pyrophyllite, sauconite, saponite, nontronite, montmorillonite or mixtures thereof. Clays usable for the adhesive and/or sealant material may be calcined or uncalcined. Clays that may be used as fillers may include clays from the kaolinite, illite, chloritem, smectite or sepiolite groups, which may be calcined. The clays may also include minor amounts of other ingredients such as carbonates, feldspars, micas and quartz. One or more mineral or stone type fillers such as calcium carbonate, sodium carbonate or the like may be used as fillers. Silicate minerals such as mica may be used as fillers.

When employed, the amount of fillers in the adhesive and/or sealant material can range from 2% to more than 30% or greater by weight, but more typical from about 8 to 25% by weight, however amounts (below 20%) are preferable in order to retain the desired elongation of the adhesive and/or sealant. According to some embodiments, the adhesive and/or sealant material may include from about 0% to about 3% by weight, and more preferably slightly less than 1% by weight clays or similar fillers. Powdered (e.g. about 0.01 to about 50, and more preferably about 1 to 25 micron mean particle diameter) mineral type filler can comprise between about 5% and 40% by weight, more preferably about 10% to about 25% by weight.

The adhesives and sealants described herein may be a liquid, a paste or a solid. It is possible that the adhesive and/or sealant material is formed as a material that is solid at ambient temperature, is non tacky to the touch and has a substantially homogeneous composition. Various mixing techniques may be used to obtain such a material.

According to one embodiment, the adhesive material may be formed by heating one or more of the components that are generally easier to soften or liquidize such as the polymer based materials to induce those components into a mixable state. Thereafter, the remaining components may then be intermixed with the softened components.

It is also possible that the materials are provided individually, as admixtures or combinations thereof to an extruder. The extruder then mixes the materials to form the adhesive and/or sealant material. Alternatively the adhesive and/or sealant material may be fully mixed and formed and then fed to an extruder for dispensing.

Figure 2:
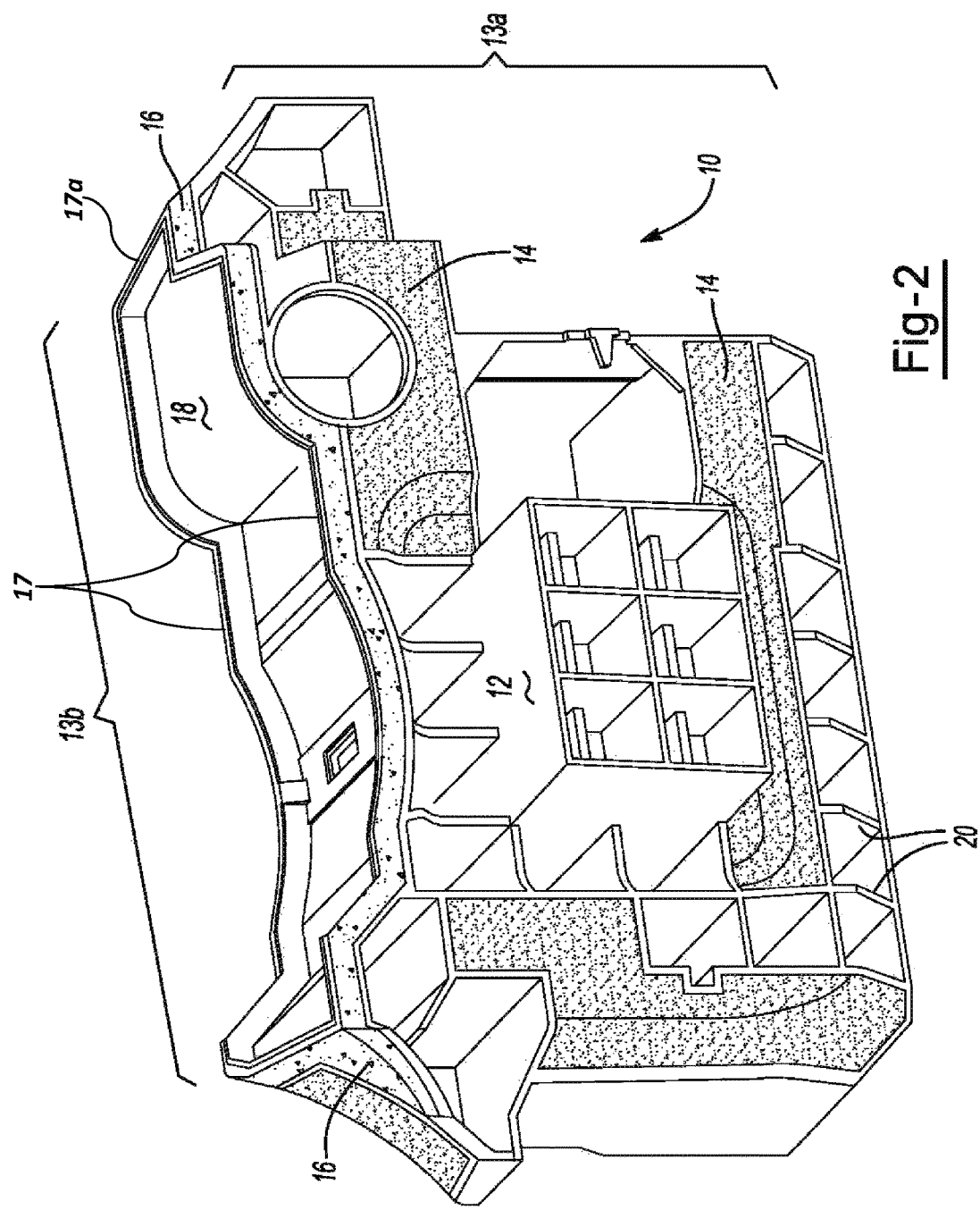
FIG. 2 is a perspective view of the reinforcement of FIG. 1.
Figure 3:
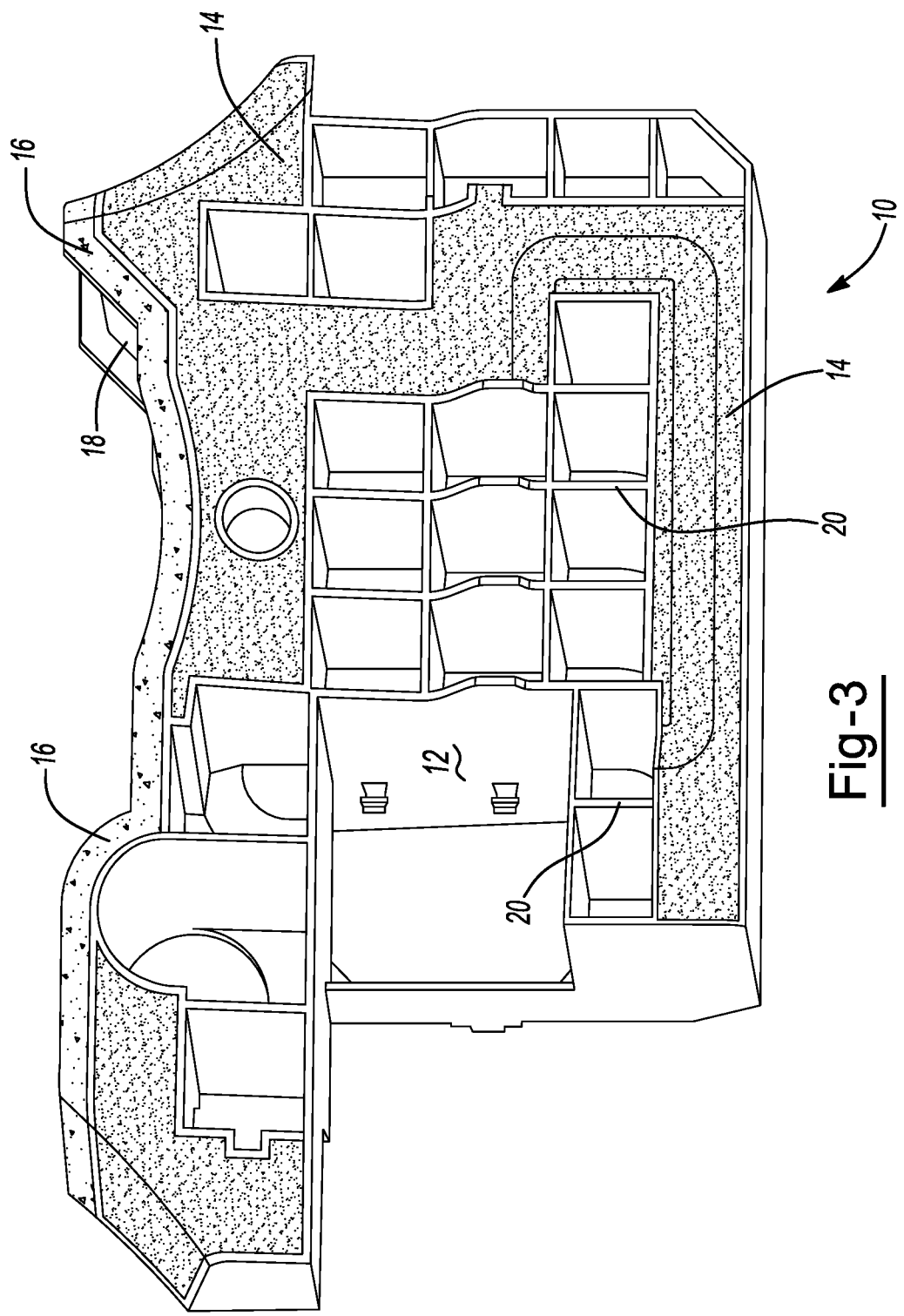
FIG. 3 is a perspective view of the reinforcement of FIG. 1.

As shown for example in FIGS. 1-3, the reinforcement structure 10 is shown having a base reinforcing structure 12 having a first surface 13a and a second surface 13b, an adhesive material 14 located on the first surface 13a and a sealant material 16 located onto an edge, which may be about the periphery, of the second surface 13b. The first surface 13a and the second surface 13b adjoin each other along a portion 17a of the peripheral edge 17. The first surface may include a plurality of intersecting rib structures 20. The second surface may include a substantially flat portion 18. The flat portion 18 is shown in the figures as being substantially free of any adhesive material 14. The rib structures 20 are shown in the figures as being substantially free of any sealant material 16.

The reinforcement structure may be formed by a combination of molding steps and extrusion steps. The base reinforcing structure may be formed by an injection molding step. The adhesive material may be applied to the base reinforcing structure by a second molding process (e.g., a two-shot molding process) whereby the adhesive material is injection molded onto the base reinforcing structure. The sealant material may then be extruded onto the base reinforcing structure. The extrusion process may be completed by a traditional twin screw extruder, or may be extruded by a robotic extrusion system, including a mini applicator (e.g., mini extruder) attached to a robotic arm. The base reinforcing structure may thus be removed from a molding device (such removal may be automated) and moved in-line to a location where the sealant material is extruded onto a portion of the base reinforcing structure.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A structural reinforcement comprising:
   i) a molded base reinforcing structure including a plurality of intersecting ribs and having a first surface, and a second surface, the second surface having a peripheral edge located about a substantially flat portion, the first surface and the second surface being generally perpendicular relative to each other and adjoining each other along a portion of the peripheral edge;
   ii) an expandable adhesive material that experiences expansion upon exposures to temperatures of between about 148.89° C. to about 204.44° C. located onto a portion of the first surface;
   iii) a sealant material that experiences expansion and/or cure upon exposures to temperatures of between about 148.89° C. to about 204.44° C. located around the peripheral edge of the second surface.

2. The structural reinforcement of claim 1, wherein the expandable adhesive material and sealant material are free of any direct contact with one another prior to any expansion and/or curing.

3. The structural reinforcement of claim 1, wherein the expandable adhesive material has a higher expansion rate than the sealant material.

4. The structural reinforcement of claim 1, wherein the expandable adhesive material is in a form of an extrusion.

* * * * *